No. 760,420. PATENTED MAY 24, 1904.
H. J. CASE.
BUNDLE CARRIER FOR CORN HARVESTERS.
APPLICATION FILED FEB. 23, 1904.
NO MODEL. 3 SHEETS—SHEET 1.
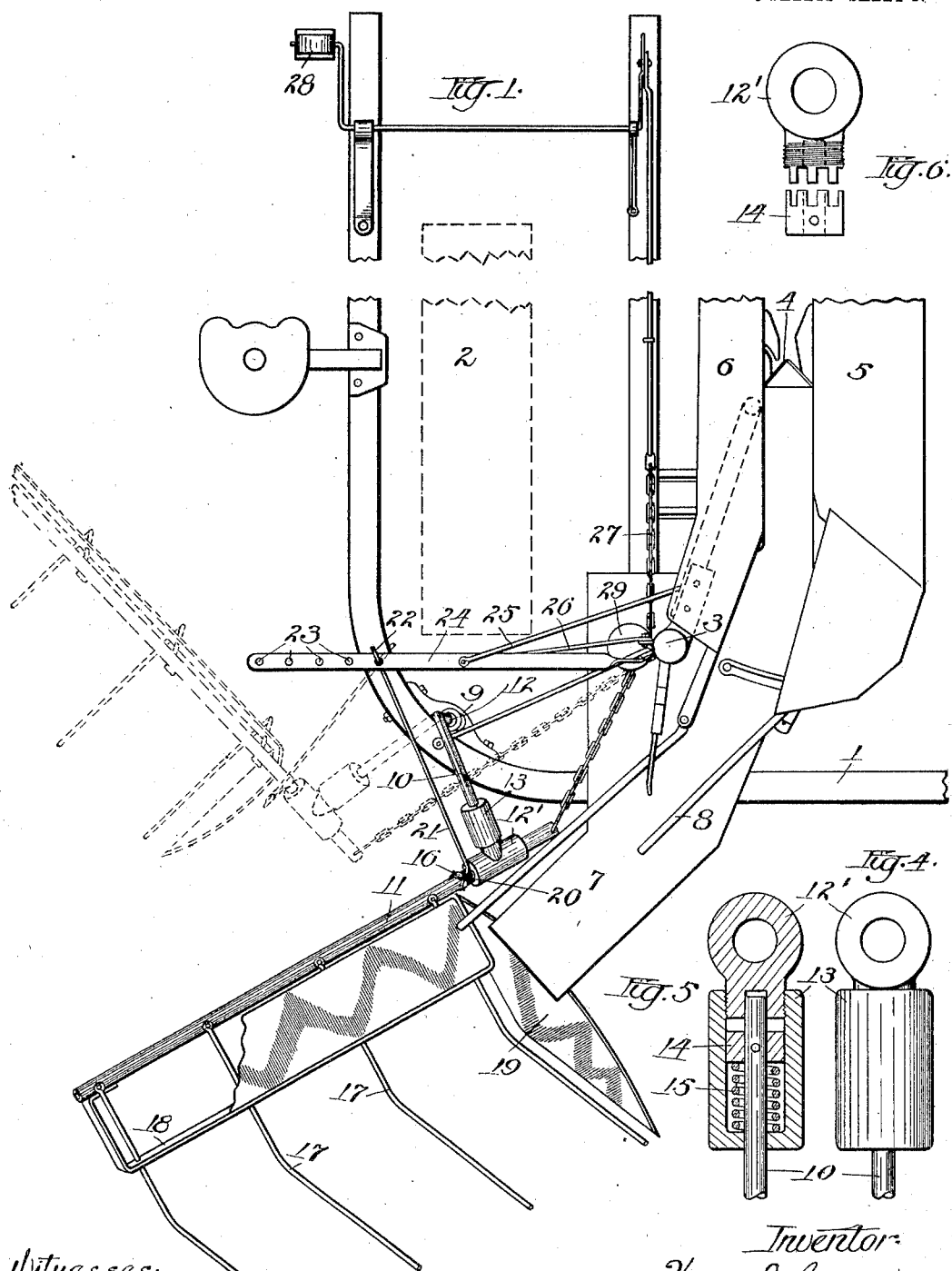
Witnesses:
J. N. Daggett.
J. H. Alfreds
Inventor:
Henry J. Case.
By J. C. Warnes,
Atty.

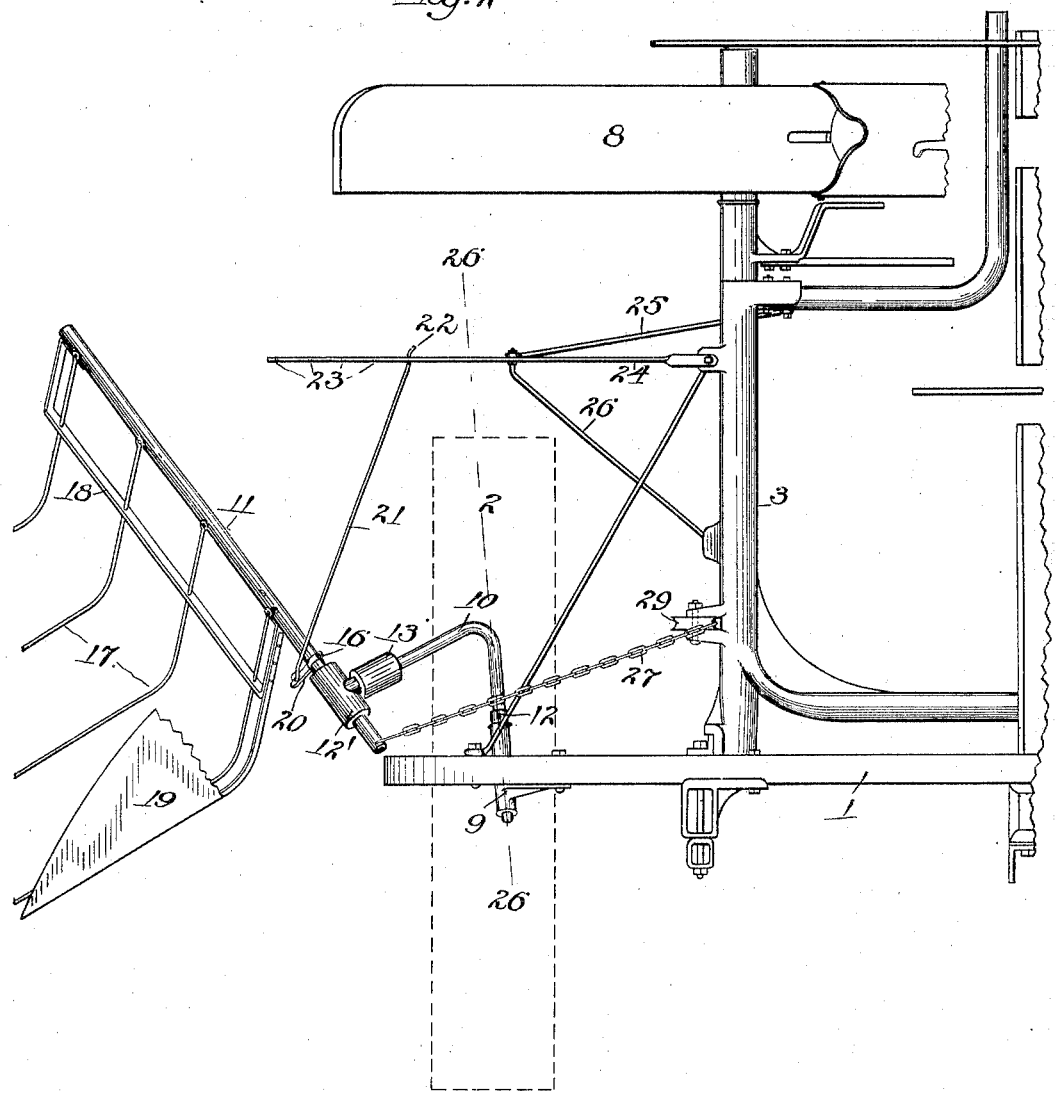

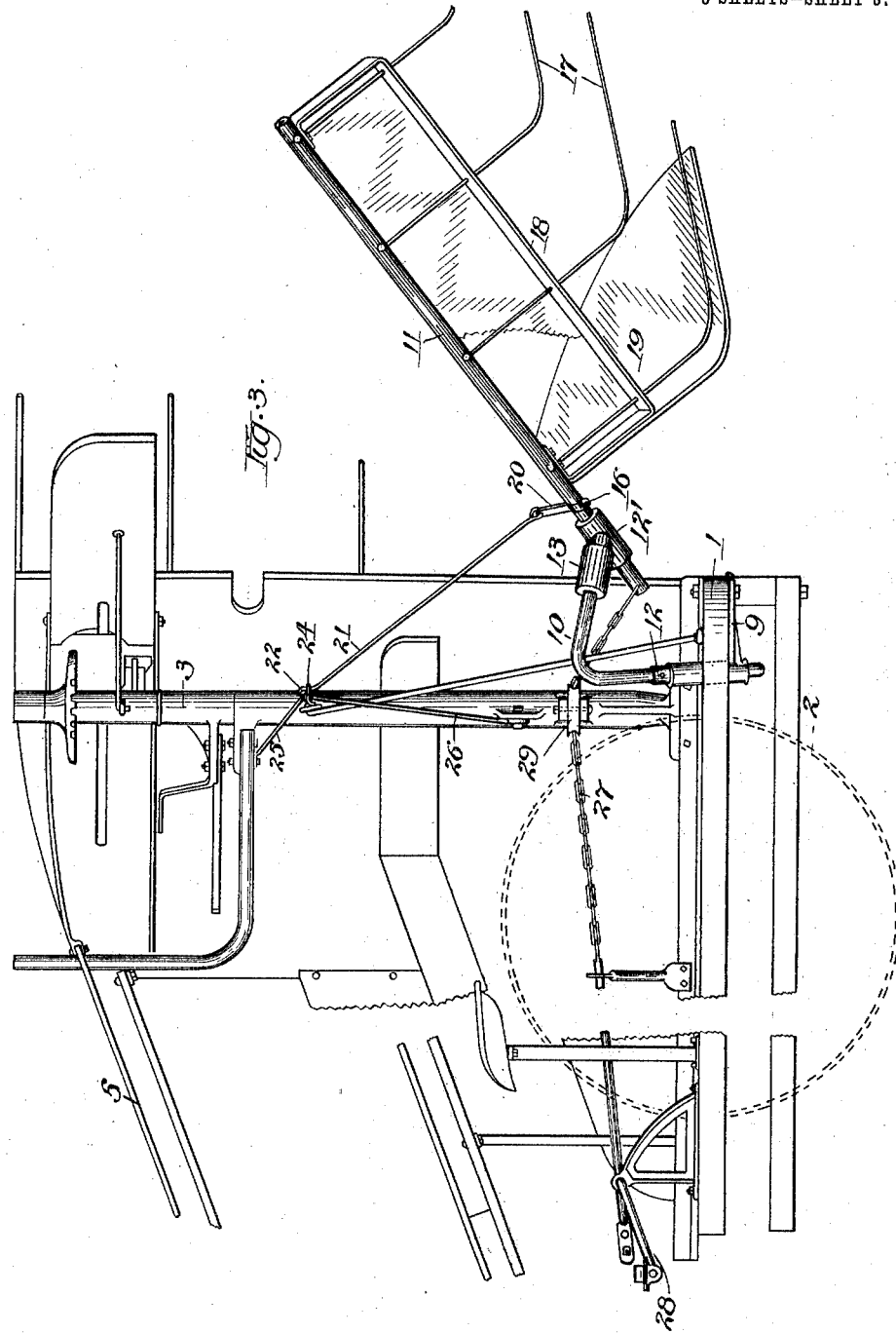

No. 760,420. Patented May 24, 1904.

UNITED STATES PATENT OFFICE.

HENRY J. CASE, OF OWASCO, NEW YORK, ASSIGNOR TO INTERNATIONAL HARVESTER COMPANY, A CORPORATION OF NEW JERSEY.

BUNDLE-CARRIER FOR CORN-HARVESTERS.

SPECIFICATION forming part of Letters Patent No. 760,420, dated May 24, 1904.

Application filed February 23, 1904. Serial No. 194,776. (No model.)

*To all whom it may concern:*

Be it known that I, HENRY J. CASE, a citizen of the United States, residing at Owasco, in the county of Cayuga and State of New York, have invented a new and useful Improvement in Bundle-Carriers for Corn-Harvesters, of which the following is a complete specification.

This invention relates more particularly to bundle-carriers for use on corn-harvesting machines of the class in which the binder is arranged in substantially a vertical position, the corn being cut, bound, and discharged before being prostrated. The bundle-carrier occupies a position somewhat inclined, so that the bundles are received from the binder in an upright position, are held somewhat oblique, and finally deposited in a prostrate position upon the ground.

The object of the invention is the production of a bundle-carrier light and simple in construction, and one in which the load is deposited some distance laterally from the machine, the lateral movement being effected through the action of gravity on the load of said carrier, and this lateral movement which carries the bundle stubbleward simultaneously operating to depress the fingers in order to discharge the bundles.

Referring to the drawings, Figure 1 represents a plan view of a portion of a corn-harvester, showing the improved bundle-carrier in connection therewith, the bundle-carrier being shown in its receptive position in full lines and in its dumping position in dotted lines. Fig. 2 is a rear elevation of the bundle-carrier and the binder-frame, showing the method of supporting the former on the latter. Fig. 3 represents a stubble-side elevation substantially of those parts shown in Fig. 1.
Figs. 4, 5, and 6 are detail views showing the member by which the supporting-bar of the bundle-carrier is made vibratable and angularly adjustable relative to its support, Fig. 4 being a side elevation of the device complete, Fig. 5 a longitudinal section of the same, and Fig. 6 a detached detail of the clutching elements of this member.

In the drawings, 1 designates a portion of the main frame of a corn-harvester; 2, the main supporting and driving wheel; 3, the frame of the vertically-disposed binder; 4, the knife for severing the corn, and 5 and 6 the upper, grainward, and stubbleward boards, respectively, which aid in forming the stalk passage-way.

7 is the board or plate which forms the bottom of the stalk passage-way, extending rearward or stubbleward from the binder, while 8 forms a guard or deflector to control the movement of the tops of the bundles in their discharge from the vertically-disposed binder to the bundle-carrier.

Since the above-mentioned elements constitute no part of this invention, a more specific description is deemed unnecessary, and they are of importance only in so far as they illustrate the application of the improved bundle-carrier to the corn-harvester.

9 is the bearing for the bundle-carrier support, secured, preferably, to the main frame of the harvester stubbleward and slightly rearward of the binder-frame 3. This bearing consists, essentially, of a sleeve, the upwardly-extending axis of which is inclined stubbleward and slightly forward, and the laterally-extending lugs for securing it to frame of the machine. In this sleeve is journaled the vertically-extending portion of the bundle-carrier support, which is formed by the bent bar 10. On the free end of the laterally-extending portion of this bundle-carrier support is mounted finger-post 11 of the bundle-carrier. To take the end thrust of the load on the bar 10, a collar 12 is secured to said bar above the sleeve of the bearing 9. The connection between the bent bar 10 and the post 11 of the bundle-carrier may be effected in any desired manner, but preferably in such a manner as will render the said post 11 angularly adjustable with respect to the pivotal axis of the said bar and also capable of being vibrated or rocked in its support. This connection is effected by the device shown in Figs. 4, 5, and 6. Referring to these figures, 12' represents a head-piece adapted to receive the finger-post 11 of the bundle-carrier, said head-piece being provided with clutch-teeth on its inner end and with threads to receive the spring-case 13. 14 is a collar provided with clutch-teeth corresponding to those on the head-piece 12', and this collar is pinned or otherwise secured to the free end of the laterally-deflected portion of the bent bar 10. A spring 15 is interposed within and between the top of the spring-case 13 and the clutch-collar 14. The pressure exerted by this spring tends normally to hold the head-piece 12 in engagement with the clutch-collar 14. It will thus be seen that by moving the head 12', carrying the bundle-carrier post, outwardly against the stress exerted by the spring 15 until the clutch-teeth are disengaged the finger-post 11 of the bundle-carrier can be placed at any desired angle relative to the axis of movement of the bent bar 10. Collars 16, secured to the finger-post 11 adjacent to the head-piece 12', prevent an endwise movement of the bundle-carrier, and yet permit it to rock or vibrate in its bearing. The fingers 17 of the bundle-carrier are secured to the finger-post 11 and are further reinforced and supported by the bar 18, which extends parallel with the post 11 and some distance therefrom. This reinforcing or supporting bar 18 is provided with a series of finger-engaging apertures and also with bent ends, which return to and connect with the said post 11 by bolts or other means. These fingers 17 are bent, as shown in the several figures, that portion of the fingers rearward of the point of flexure constituting the bed of the bundle-carrier and that portion between the flexure and post 11 forming means which will prevent the bundles falling or rolling forwardly. To prevent stalks and other material catching on the fingers between the reinforcing-bar 18 and the post 11 and upon the reinforcing-bar itself, a thin board or sheet of metal is placed over this part of the bundle-carrier.

To prevent the bundles sliding off the bundle-carrier endwise, a deflector or butt-support 19 is secured to the bundle-carrier, near the lower finger thereof. This butt-support will not only prevent longitudinal movement of the bundles on the carrier, but in dumping will also aid in depositing the bundles farther stubbleward, since the free end of said deflector extends obliquely stubbleward and will aid in imparting an oblique movement to the said bundles.

To the finger-post 11 of the bundle-carrier is rigidly secured the arm 20 at a position preferably near the point of support of said post. Extending upwardly from the free end of this arm is the rod 21, having the hooked end 22, which engages one of a series of apertures 23 in a horizontally and stubbleward extending bar 24. This bar 24 is secured, preferably, to the binder-frame 3 and is braced above by the rod 25 and below by the rod 26. This bar 24 lies substantially vertical coincident with the pivotal axis of the bent bar 10 or bundle-carrier support. The inclined axis of this bent bar 10 will, if produced, intersect the horizontally-extending bar 24 somewhat grainward of the pivotal connection of the rod 21 with said bar, as indicated by the line 26 26 in Fig. 2. If this point of connection with the bar 24 should be coincident with the intersection above referred to, then a rotation of the bundle-carrier about the axis 26 26 would effect no rocking or vibrating movement of the supporting-post 11 of the bundle-carrier, but being stubbleward of said point the effect will be to vibrate the post 11, depressing the fingers of the bundle-carrier as the bundle-carrier is revolved from a receptive to a dumping position and raising them in swinging back to normal position. The amount of such movement will be controlled by the distance from the connecting-point of the rod 21 with the bar 24 from the line 26 26—$i.\ e.$, the farther stubbleward the connecting-point the more movement and the farther grainward the less movement.

The bundle-carrier is operated by a chain 27, passing from the lower end of the post 11 around the sheave 29, which is secured to the binder-frame or other suitable support and connecting forwardly with the foot-lever 28, which is within convenient reach of the operator. When the foot-lever is down, as shown in Fig. 3, the bundle-carrier is in a receptive position, or in a position in which the fingers traverse the path of discharge of the bundles from the binder. In this position the line of the chain 27, connecting with the foot-lever 28, practically intersects the pivotal point of said foot-lever, thus bringing the said lever on a "dead-center" and enabling the operator to easily hold it in this position until a sufficient load has been accumulated to dump. Since the axis about which the bundle-carrier moves is inclined stubbleward, whenever the operator releases the foot-lever the load by its own weight will swing stubbleward and be dumped, the rod 21 permitting the finger-post 11 to rock or vibrate and depress the free ends of the fingers. The bundle-carrier is returned to its receptive position by the operator pressing the foot-lever and swinging it back to position. This movement can be aided by the interposition of a spring, if desired; but no such spring is shown.

From the foregoing construction it will be seen that the bundle-carrier is made to discharge its load by gravity acting on same through the inclination stubbleward of the axis of movement of the supporting-bar 10. The bundle-carrier by being supported on the free end of the arm some distance laterally from the axis about which it turns is made to move much farther stubbleward than would result if the supporting-bar 11 moved in a conical plane with the pivotal connection at the apex of the cone. The path of movement of the finger-post 11 is about an axis which it does not intersect, and from a mathematical point of view describes a hyperboloid of revolution.

What I claim as my invention, and desire to secure by Letters Patent, is—

1. In a corn-harvester provided with a vertically-arranged binder, in combination, a bundle-carrier support pivotally mounted on the stubble side of the said harvester and having its axis of movement inclined from the vertical upward and stubbleward, and an independently-constructed bundle-carrier frame secured to the said support, the point of securement of said frame to said support being laterally disposed with respect to the pivotal axis of the latter and the main supporting member of the bundle-carrier frame being disposed in a vertical plane non-intersecting with respect to its axis of movement, substantially as described.

2. In a corn-harvester provided with a vertically-arranged binder, in combination, a bundle-carrier support pivotally mounted on the stubble side of said harvester and having its axis of movement inclined from the vertical upward and stubbleward, a bundle-carrier frame vibratably secured to said support, the point of securement being laterally disposed with respect to the pivotal axis of the support, and means for automatically controlling the movement of the said bundle-carrier frame in its bearings on said support as the frame swings to deposit its load, substantially as described.

3. In a corn-harvester provided with a vertically-arranged binder, in combination, a bundle-carrier support pivotally mounted on the stubble side of said harvester and having its axis of movement inclined stubbleward and upward from the vertical, a bundle-carrier frame vibratably secured to said support, the point of securement being laterally disposed with respect to the pivotal axis of the support, and means connecting the bundle-carrier frame to a fixed point on the frame of the machine for automatically controlling the rocking movement of the said bundle-carrier frame in its bearing on said support as the bundle-carrier swings stubbleward to deposit its load, the connecting-point of the said means with the frame of the machine lying stubbleward of the pivotal axis of said bundle-carrier support, substantially as described.

4. In a corn-harvester provided with a vertically-arranged binder, in combination, a bundle-carrier support pivotally mounted on the stubble side of the said harvester and having its axis of movement inclined from the vertical upward and stubbleward, a finger-post vibratably mounted in bearings upon said support and having an angular adjustment relative to the axis of movement thereof thereby adapting the said post to revolve about the pivotal axis of the said support at any desired angle of elevation relative thereto, a series of fingers secured to said post, and means for automatically vibrating the said post in its bearing as the bundle-carrier swings upon the support, substantially as described.

5. In a corn-harvester provided with a vertically-arranged binder, in combination, a bundle-carrier support consisting of a vertically-disposed bar having a laterally-deflected end, the pivotal axis of said bar inclining upward and stubbleward, correspondingly-inclined bearing in which the said bundle-carrier support journals, a bundle-carrier finger-post vibratably mounted on the laterally-deflected end of said support and angularly adjustable relative to the axis of movement thereof, and means automatically operated by the swinging movement of the said bundle-carrier for controlling the vibratile movement of the finger-post in its bearing, substantially as described.

6. In a corn-harvester provided with a vertically-arranged binder, in combination, a bundle-carrier support pivotally mounted on the stubble side of said harvester and having its axis of movement inclined from the vertical upward and stubbleward, a bundle-carrier frame vibratably secured to said support, the point of securement being laterally disposed with respect to the pivotal axis of the support, and adjustable means for automatically controlling the extent of the vibratory movement of the bundle-carrier frame in its bearing as the frame swings on the bundle-carrier support to deposit its load, substantially as described.

HENRY J. CASE.

Witnesses:
RICHARD BUTLER,
JAS. M. SHEPARD.